March 10, 1925. 1,528,977
J. O. LEONARD
JACK
Filed May 7, 1924 2 Sheets-Sheet 2
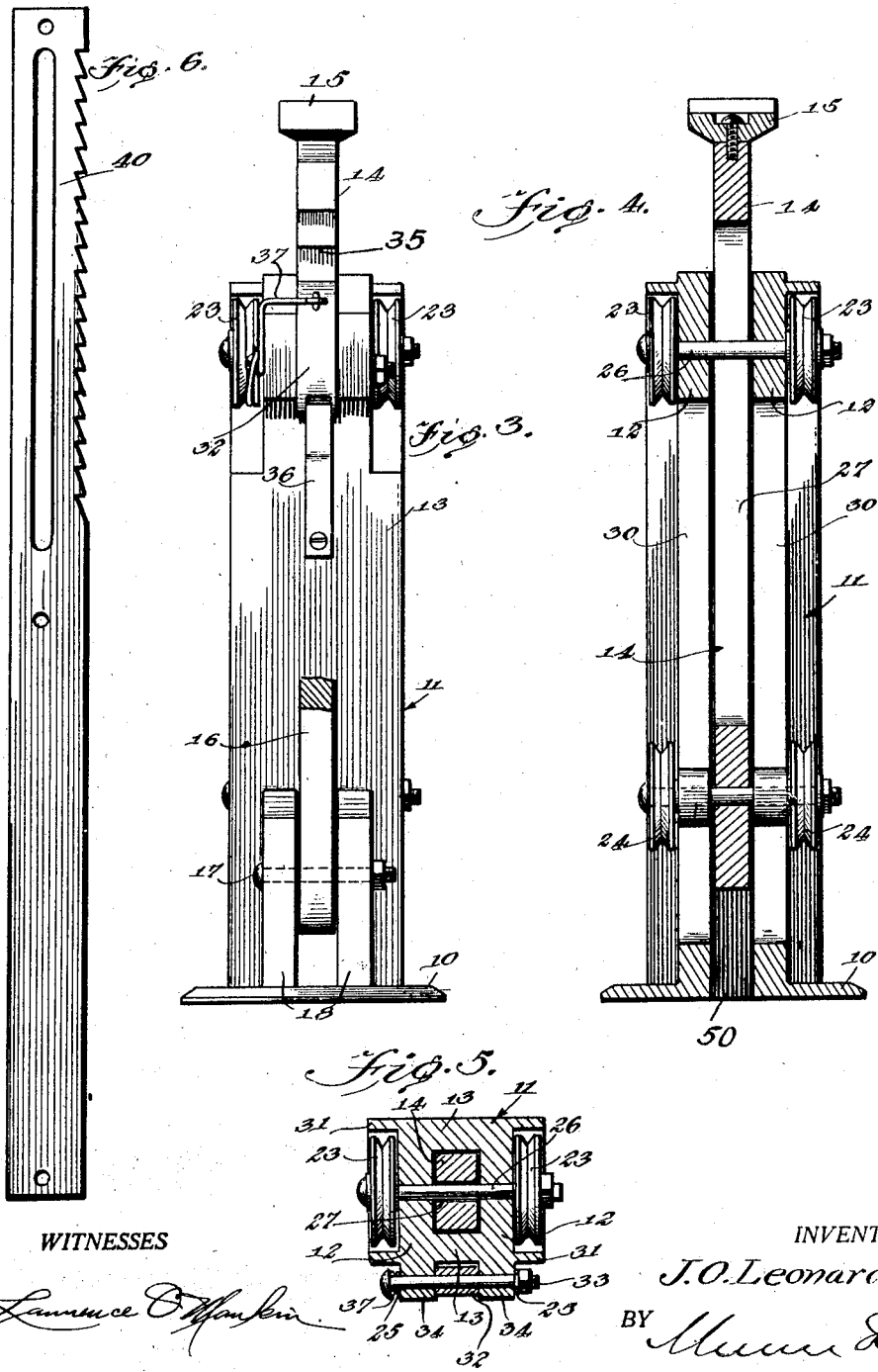
WITNESSES
INVENTOR
J. O. Leonard,
BY
ATTORNEYS Patented Mar. 10, 1925.

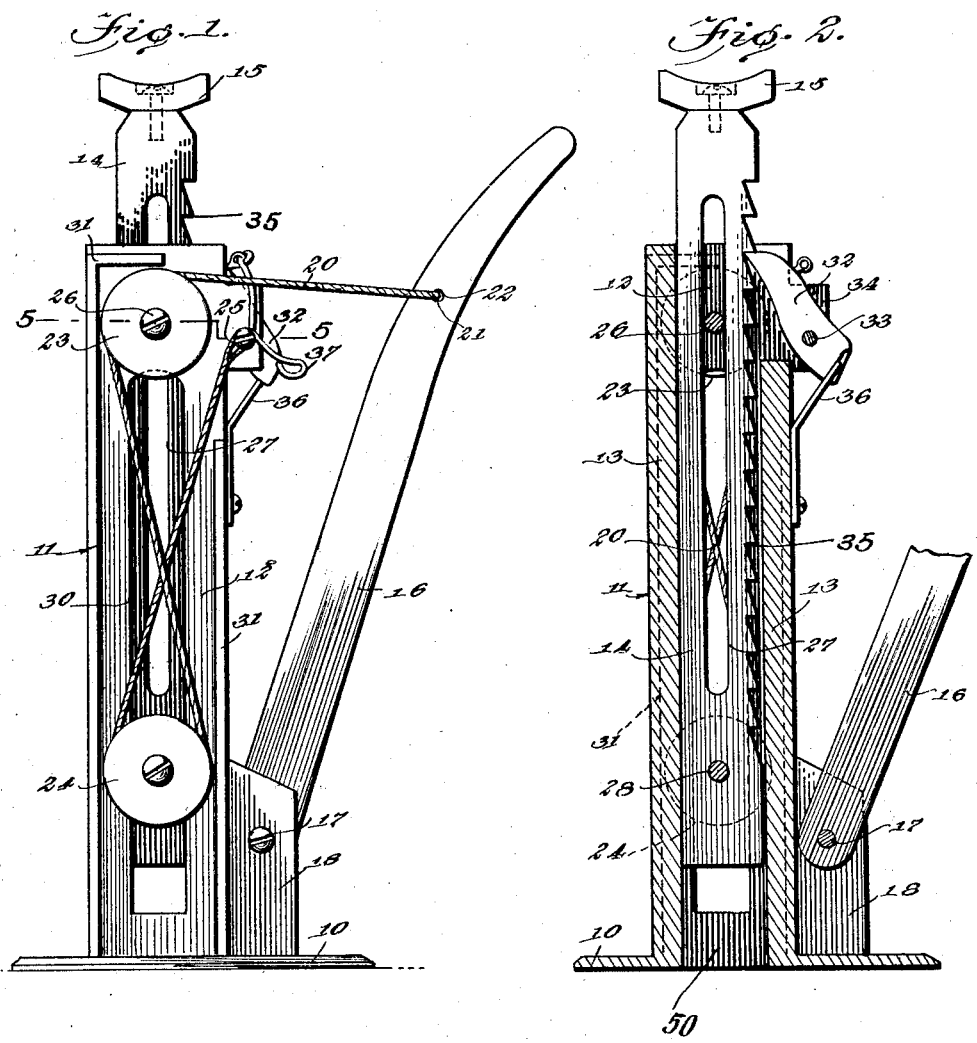

1,528,977

UNITED STATES PATENT OFFICE.

JOSEPH OSCAR LEONARD, OF MIDDLEPORT, OHIO.

JACK.

Application filed May 7, 1924. Serial No. 711,618.

*To all whom it may concern:*

Be it known that I, JOSEPH OSCAR LEONARD, a citizen of the United States, and a resident of Middleport, in the county of Meigs and State of Ohio, have invented certain new and useful Improvements in Jacks, of which the following is a specification.

This invention relates to a jack which is also adapted for use as a brake for vehicles.

The object of the invention is to provide a jack which may be quickly and easily operated with a single continuous movement to apply a powerful lifting force to an object to be raised or a powerful thrust to an object to be pushed.

A further object is to provide a jack having these advantages and capacities and which is also of simple and durable construction reliable in operation and easy and comparatively inexpensive to manufacture.

A still further object is to provide a jack which with slight modifications and adaptations may be used to advantage as a brake for vehicles.

Other objects and advantages reside in the certain novel features of the construction, combination and arrangement of parts, which will be hereinafter more fully described and particularly pointed out in the appended claims forming a part of this specification, reference being had to the accompanying drawings also forming a part of this specification, and in which:

Figure 1 is a view in side elevation of the device in use as a jack,

Figure 2 is a view thereof in central longitudinal vertical section with parts shown in elevation for the sake of simplicity in illustration, Figure 3 is a view in end elevation with a portion of the operating lever broken away, Figure 4 is a view in transverse central vertical section with parts shown in elevation for the sake of illustration, Figure 5 is a view in transverse horizontal section on line 5—5 of Figure 1, the cables being omitted and parts being shown in elevation for the sake of simplicity in illustration, and Figure 6 is a view of the adaptor bar utilized when the device is employed as a brake.

Referring to the drawings and more particularly to Figures 1 to 5, it will be seen that the invention contemplates a base 10 having an upstanding frame 11 integral therewith or suitably connected thereto. The frame 11 includes vertical side walls 12 and vertical end walls 13 integral with or suitably connected to each other. These spaced walls 12 and 13 define a slide or bearing in which a lifting bar 14 is slidably fitted for vertical adjustment. The bar 14 is introduced into the bearing of the frame from the top and the downward movement of the bar is limited by the base 10 which extends across the lower end of the bearing. At the upper end of the bar 14, the usual swiveled plate 15 is arranged.

The bar 14 is elevated from an operating lever 16 fulcrumed as at 17 to a pair of vertically disposed and spaced bracket plates 18 integral with or suitably connected to the sides 12 of the frame. In order that a single continuous downward movement of the lever 16 may be effective to elevate the lifting bar 14 to its full extent, a cable 20 is provided and has a bight 21 formed intermediate its ends and engaged with an opening 22 formed in the lever 16 adjacent its free end. The cable 20, beyond the point where it engages the lever 16, is trained over the members 23 of a stationary pair of pulleys or sheaves and then down under and around the members 24 of a pair of traveling pulleys or sheaves. The ends of the cable 20 are fixed or anchored to the frame 10 at a point above the upper limit of travel of the pulleys 24 as indicated at 25. The pulleys 23 are stationary in the sense that they are mounted on a fixed axis or shaft 26, although the pulleys are rotatable about the shaft as an axis. The shaft 24 extends transversely of the frame 11 and is journaled in bearings provided in the sides 12 thereof adjacent the upper end of the frame. The lifting bar 14 is formed with a lengthwise slot 27 across which the shaft 26 extends whereby the lifting bar 14 may be adjusted vertically without obstruction from the shaft 26. The traveling pulleys 24 are rotatable about an axis or shaft 28 journaled in bearings provided in the lifting bar 14 adjacent its lower end. The members of the pairs of pulleys 23 and 24 are mounted on the ends of their respective shafts 26 and 28 and are disposed flush against the sides 12 of the frame 11. In order to permit the shaft 28 to freely move with the lifting bar 14, the sides 12 of the frame 11 are formed with lengthwise slots 30. Marginal flanges 31 are formed on the sides of the frame 11 to guard and protect the pulleys 23 and 24 and the runs of the cable 20 that are engaged with these pulleys and if desired removable cover plates may be applied to these flanges.

Releasable means is provided for holding the lifting bar 14 in adjusted vertical position and comprises a pawl 32 pivotally mounted as at 33 on lugs 34 provided on the frame 11, the pawl 32 being engageable with ratchet teeth 35 formed on the lifting bar 14. The teeth 35 have horizontal under faces and inclined upper faces and a spring 36 is associated with the pawl 32 to cause the same to snap into engagement with the horizontal under faces of the teeth 35 as the lifting bar 14 is elevated. A release lever 37 is pivotally mounted on the pivot bolt 33 and is pivotally connected to the pawl 32 to facilitate the disengagement of the pawl 32 from the ratchet teeth 35.

With the arrangement described the lifting bar 14 of the jack may be elevated to the full extent or to any desired extent by a single continuous downward movement of the lever 16 and yet the requisite degree of power may be applied. The bar 14 is held in any position to which it may be elevated or adjusted by the action of the pawl 32 and ratchet teeth 35, moreover the lowered and the lowering movement may be controlled.

By removing the lifting bar 14 and inserting the adaptor bar 40 shown in Figure 6 the device is adapted for use as a hand brake on vehicles such as automobiles, wagons, freight cars or the like, of course the base 10 may be omitted and suitable arrangements provided for bolting the frame 10 in position. Also suitable motion transmission devices are provided between the bar 40 and the braking element.

It is to be understood that in lieu of a cable, a rope, a chain or other flexible element may be employed.

It is also to be noted that the shaft 26 and groove 27 serve to guide the lifting bar 14 and constrain it to partake of its proper movements.

It is also to be understood that when the adapter bar 40 is employed and the device used as a brake that the base is provided with an opening 50 to permit the adapter bar to pass therethrough.

I claim:—

1. In a device of the character described, a frame having a vertically extending bearing, a bar slidably mounted in the bearing, an operating lever fulcrumed on the frame, a pair of pulleys journaled on the frame adjacent its upper end, a pair of pulleys journaled on the bar adjacent its lower end, the frame having slots accommodating the axis of the pulleys of the bar, the members of the pairs of pulleys being arranged on the opposite sides of the frame, and a flexible element connected to the lever trained over the pulleys of the frame, around and under the pulleys of the bar and anchored to the frame at a point above the upper limit of travel of the pulleys of the bar.

2. In a device of the character described, a frame having a vertically extending bearing, a bar slidably mounted in the bearing, an operating lever fulcrumed on the frame, a pair of pulleys journaled on the frame adjacent its upper end, a pair of pulleys journaled on the bar adjacent its lower end, the frame having slots accommodating the axis of the pulleys of the bar, the members of the pairs of pulleys being arranged on the opposite sides of the frame, and a flexible element connected to the lever trained over the pulleys of the frame, around and under the pulleys of the bar, anchored to the frame at a point above the upper limit of travel of the pulleys of the bar and releasable pawl and ratchet means for holding the bar in elevated position.

JOSEPH OSCAR LEONARD.